United States Patent
Redl et al.

(10) Patent No.: US 11,059,271 B2
(45) Date of Patent: Jul. 13, 2021

(54) COMPONENT COMPOSED AT LEAST TO SOME EXTENT OF A LAYER STRUCTURE AND PROCESS FOR PRODUCTION THEREOF

(71) Applicant: BASF SE, Ludwigshafen am Rhein (DE)

(72) Inventors: Franz Xaver Redl, Lemfoerde (DE); Marcus Leberfinger, Georgsmarienhuette (DE); Timo Prozeske, Stemshorn (DE); Sonja Werther, Wetschen (DE); Christine Rolfsen, Osnabrueck (DE); Thomas Gruidl, Oberdrauburg (AT); Harald Assmair, Virgen (AT)

(73) Assignee: BASF SE, Ludwigshafen (DE)

( * ) Notice: Subject to any disclaimer, the term of this patent is extended or adjusted under 35 U.S.C. 154(b) by 344 days.

(21) Appl. No.: 15/512,240

(22) PCT Filed: Sep. 16, 2015

(86) PCT No.: PCT/EP2015/071220
§ 371 (c)(1),
(2) Date: Mar. 17, 2017

(87) PCT Pub. No.: WO2016/042028
PCT Pub. Date: Mar. 24, 2016

(65) Prior Publication Data
US 2017/0305120 A1    Oct. 26, 2017

(30) Foreign Application Priority Data

Sep. 19, 2014   (EP) .................................... 14185609

(51) Int. Cl.
| | |
|---|---|
| *B29C 41/22* | (2006.01) |
| *B29K 75/00* | (2006.01) |
| *B29K 105/04* | (2006.01) |
| *B32B 25/08* | (2006.01) |
| *B32B 5/20* | (2006.01) |
| *B32B 27/40* | (2006.01) |
| *B32B 5/32* | (2006.01) |
| *B32B 5/22* | (2006.01) |
| *B32B 27/06* | (2006.01) |
| *B32B 7/02* | (2019.01) |

(Continued)

(52) U.S. Cl.
CPC .............. *B32B 25/08* (2013.01); *B29C 41/22* (2013.01); *B32B 5/20* (2013.01); *B32B 5/22* (2013.01); *B32B 5/32* (2013.01); *B32B 7/02* (2013.01); *B32B 25/02* (2013.01); *B32B 27/065* (2013.01); *B32B 27/08* (2013.01); *B32B 27/40* (2013.01); *B29K 2075/00* (2013.01); *B29K 2105/04* (2013.01); *B32B 2250/22* (2013.01); *B32B 2255/00* (2013.01); *B32B 2255/26* (2013.01); *B32B 2262/101* (2013.01); *B32B 2266/0207* (2013.01); *B32B 2266/0278* (2013.01); *B32B 2307/306* (2013.01); *B32B 2307/308* (2013.01); *B32B 2307/50* (2013.01); *B32B 2307/51* (2013.01); *B32B 2307/536* (2013.01); *B32B 2307/54* (2013.01); *B32B 2307/554* (2013.01); *B32B 2307/558* (2013.01); *B32B 2307/56* (2013.01); *B32B 2307/5825* (2013.01); *B32B 2307/72* (2013.01); *B32B 2307/738* (2013.01); *B32B 2419/00* (2013.01); *B32B 2457/00* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 2,910,381 A | * 10/1959 | Vogel ...................... | B05D 7/16 148/251 |
| 3,937,861 A | 2/1976 | Zuckerman et al. | |

(Continued)

FOREIGN PATENT DOCUMENTS

| | | |
|---|---|---|
| DE | 40 07 569 A1 | 9/1990 |
| DE | 196 33 479 A1 | 2/1998 |

(Continued)

OTHER PUBLICATIONS

MatWeb, "Tensile Property Testing of Plastics," http://www.matweb.com/reference/tensilestrength.aspx (Year: 1996).*

(Continued)

*Primary Examiner* — Frank J Vineis
*Assistant Examiner* — Nicole T Gugliotta
(74) *Attorney, Agent, or Firm* — Armstrong Teasdale LLP

(57) ABSTRACT

The invention relates to a component having at least to some extent a layer structure, wherein the layer structure includes an elastomer layer with a density greater than 800 g/L, and a thermoset layer including at least 50% by weight of a first polyurethane. The invention further relates to a process for the production of a component of this type, the process including (i) provision of a female mold into which the individual layers of the layer structure are introduced, or of a male mold to which the individual layers of the layer structure are applied; (ii) production of the elastomer layer via spraying; (iii) production of the thermoset layer via spraying; and (iv) demolding of the resultant component. Step (ii) can be carried out before step (iii) or step (iii) can be carried out before step (ii).

18 Claims, No Drawings

(51) Int. Cl.
  *B32B 27/08* (2006.01)
  *B32B 25/02* (2006.01)

(56) References Cited

U.S. PATENT DOCUMENTS

| | | | |
|---|---|---|---|
| 5,140,088 A * | 8/1992 | Ehrhart | C08G 18/10 |
| | | | 528/59 |
| 2004/0262808 A1 | 12/2004 | Wu et al. | |
| 2005/0009638 A1 | 1/2005 | Wu et al. | |
| 2006/0091574 A1 | 5/2006 | Mellentine et al. | |
| 2007/0067994 A1 | 3/2007 | Cowelchuk et al. | |
| 2012/0053020 A1 | 3/2012 | Wright | |
| 2014/0147607 A1 * | 5/2014 | Leventis | B01J 20/28011 |
| | | | 428/36.5 |

FOREIGN PATENT DOCUMENTS

| | | |
|---|---|---|
| DE | 10 2005 023320 A1 | 11/2006 |
| DE | 10 2010 043 284 A1 | 5/2012 |
| DE | 10 2011114494 A1 | 4/2013 |
| EP | 1 172 203 A1 | 1/2002 |
| JP | 2002086656 A | 3/2002 |
| JP | 2007223204 A | 9/2007 |
| JP | 2007245540 A | 9/2007 |
| JP | 2009538938 A | 11/2009 |
| JP | 2010082721 A | 4/2010 |
| JP | 2015527453 A | 9/2015 |
| WO | 9414587 A2 | 7/1994 |

OTHER PUBLICATIONS

International Search Report issued in International Application No. PCT/EP2015/071220 dated Dec. 22, 2015.

P.J. Slikkerveer et al., "Erosion of elastomeric protective coatings," WEAR, vol. 236, No. 1-2, Dec. 1, 1999, pp. 189-198.

Deka H. et al., "Bio-based hyperbranched polyurethanes for surface coating applications," Progress in Organic Coatings, Elsevier BV, NL, vol. 66, No. 3, Nov. 1, 2009, pp. 192-198.

Norbert Adam et al., "Polyurethanes" In: "Ullmann's Encyclopedia of Industrial Chemistry", Jan. 15, 2005.

Elastomere—Dicht und Konstruktionswerkstoffe, Gummitechnik, Dr.-Ing. Walter Gohl et al., vol. 5, 2003, pp. 29, 40-43. No English translation available. Cited during Opposition procedure of EP3194166.

Methoden der organischen Chemie, vol. 4, 1963, Eugen Mueller, pp. 79-84. No English translation available. Cited during Opposition procedure of EP3194166.

Methoden der organischen Chemie, vol. 4, 1987, pp. 1630-1637. No English translation available. Cited during Opposition procedure of EP3194166.

Makromolekuele, Struktur—Eigenschaffen—Synthesen Stolle—Technologie, vol. 4, 1981, pp. 1010, 1012, 1014, 1016. No English translation available. Cited during Opposition procedure of EP3194166.

* cited by examiner

COMPONENT COMPOSED AT LEAST TO SOME EXTENT OF A LAYER STRUCTURE AND PROCESS FOR PRODUCTION THEREOF

CROSS-REFERENCE TO RELATED APPLICATIONS

This application is a U.S. National Phase Application of PCT/EP2015/071220, filed Sep. 16, 2015, which claims the benefit of priority to EP Application No. 14185609.6, filed Sep. 19, 2014, the contents of which are hereby expressly incorporated by reference in their entirety.

The invention relates to a component composed at least to some extent of a layer structure. The invention further relates to a process for the production of a component of this type.

Components composed of a layer structure and comprising an elastomer layer and a thermoset layer can in particular be used in applications where the component is exposed to impacts. The elastomer layer reduces the effect of the impact and the likelihood of permanent deformation.

Appropriate selection of the materials for the individual layers can moreover provide appropriate properties to the material of the component, so that this can then withstand the stresses that arise in the respective application.

Components of this type composed of a layer structure are used by way of example in the coal and steel industry, for example as spiral separator or as cone or vibratory table in gravity separation. Components of this type are intended to have maximum wear resistance, so as to ensure a long lifetime. DE-A 40 07 569 discloses a production process for equipment for the separation of minerals where a component is composed of a layer composite comprising one layer made of glassfiber-reinforced polymer and a further layer made of a polyurethane applied by spraying thereto. However, a disadvantage is that both the glassfiber-reinforced polymer layer and the polyurethane layer are generally brittle, and in particular can fracture on exposure to impact.

DE-A 196 33 479 discloses a multilayer sheet-like molding. This comprises a supportive layer and a visible side, and can by way of example be used for sanitary articles or in trailer construction, or in boatbuilding. The supportive layer is composed of a reinforced polyurethane layer, and the visible side is composed of a layer of polyurethane coating material. The moldings described can be used as external cladding, and there is in particular therefore no provision here of adequate resistance of the material to increased stress due to impact and abrasion.

DE-A 10 2010 043 284 discloses sanitary items composed of a layer structure, where the sanitary items comprise a thermoplastic sheet and polyurethane reinforcing layers.

A particular disadvantage of all of the known components is that they have only limited resistance to stress due to impact and abrasion, and that they tend to shatter, or that they undergo permanent deformation.

It is therefore an object of the present invention to provide a component, and a process for production thereof, which does not have the disadvantages known from the prior art, and which moreover can in particular be used in the coal and steel industry, in the production of refrigeration equipment, and generally as replacement for surfaces that are produced from composite or from coil-coating sheet.

The object is achieved via a component composed at least to some extent of a layer structure, where the layer structure comprises the following layers:

(a) an elastomer layer with density greater than 800 g/L,
(b) a thermoset layer comprising at least 50% by weight of a first polyurethane.

By virtue of the layer structure with an elastomer layer and a thermoset layer, a component is produced which in particular is resistant to stress due to impact, since the elastomer layer reduces the effect of stresses due to impacts. This also features a less problematic fracture type and fracture behavior, in the event that stress to which the component is exposed actually leads to fracture. Another advantage of the elastomer layer is elastic deformability thereof over a wide temperature range, specifically at low temperatures, and also improved behavior in respect of abrasion.

By virtue of the layer structure with elastomer layer and thermoset layer, the resultant entire structure is highly impact-resistant and rigid, and has high puncture resistance, and is resistant to shattering over a wide temperature range. Another advantage of the layer structure with elastomer layer and thermoset layer is its high heat resistance. Because of the thermoset used, the structure remains dimensionally stable even at high temperatures of up to 150° C.

Another possibility, alongside a structure with only one elastomer layer and one thermoset layer, is to provide a plurality of alternating elastomer layers and thermoset layers. It is thus possible by way of example to achieve a greater overall thickness. An appropriate layer structure with more than, respectively, one elastomer layer and one thermoset layer can moreover further influence mechanical properties. Component distortion can also be reduced by the use of the thermoset layer and of further elastomer layers, and the elastomer layers used can provide compensation for different coefficients of expansion.

The thermoset layer can be a foamed or compact layer. If the thermoset layer is compact, i.e. unfoamed, its density is preferably greater than 800 g/L. The density of a foamed thermoset layer is generally less than 600 g/L, differing from that of the compact polymer. In comparison with a compact thermoset layer, the lower density of a foamed thermoset layer gives it lower weight for comparable properties, and use of a foamed thermoset layer can therefore reduce the total mass of the component. Foamed thermoset layers moreover exhibit less shrinkage during reaction, and therefore permit more precise replication of the geometries of the molds, with less susceptibility to distortion.

The thermoset layer in the invention comprises at least 50% by weight of a first polyurethane. The thermoset layer more preferably comprises at least 75% by weight of a first polyurethane, and in particular 100% by weight of the first polyurethane.

The thermoset layer can also comprise, alongside the polyurethane, one or more other polymers, and in that case the thermoset layer is composed of a polymer blend. Examples of suitable other polymers are polyureas, poly(meth)acrylate, polystyrene, polyamide, bisphenol-A-based polymers, and polymers with a high glass transition temperature, in particular with a glass transition temperature above 100° C. However it is particularly preferable that no other polymers are comprised. The polyurethane here can be composed either of only one polyurethane or else of a mixture of at least two different polyurethanes.

It is preferable to use, for the thermoset layer, a polyurethane which has a tensile modulus of more than 400 N/mm$^2$ and a high glass transition temperature above 70° C. It is moreover preferable that the polyurethane exhibits low shrinkage and has a low coefficient of linear thermal expansion, in order to improve the mechanical strength of the component. It is preferable that shrinkage is less than 1% and that the coefficient of linear thermal expansion is at most $110 \cdot 10^{-6}$ 1/K.

Not only when a compact thermoset layer is used but also when a foamed thermoset layer is used, the tensile strain at break of the thermoset layer is preferably at least ten times smaller than the tensile strain at break of the elastomer layer. The selection of the glass transition temperature of the thermoset layer is in particular such as to be at least 20° C. higher than the maximum usage temperature of the component.

The properties of the thermoset layer can be adjusted via use of suitable additives, for example fibrous or pulverulent fillers, low-density fillers, for example hollow glass spheres, plasticizers, impact modifiers, flame retardants, dyes, or other additives usually used in polymers. The person skilled in the art is aware of appropriate additives.

Fibrous or pulverulent fillers are in particular generally used to increase stiffness, and to reduce coefficient of linear thermal expansion. Fibrous fillers used here can take the form of continuous-filament fibers, long fibers, or short fibers. When continuous-filament fibers are used it is possible to arrange the individual fibers in a plurality of layers respectively of parallel-oriented fibers, with angles between the orientation of the fibers in the individual layers. In another possible alternative, continuous-filament fibers are used in the form of woven fabric, knitted fabric, or fiber nonwoven. Long fibers and short fibers—and also pulverulent fillers—are admixed with the polymer and the form in which they are present in the polymer is therefore usually anisotropic, depending on the method of processing.

In one embodiment of the invention the layer structure also comprises an insulating layer, where the insulating layer is composed of a rigid foam comprising at least 80% by weight of polyisocyanurate and/or second polyurethane. If the insulating layer comprises a second polyurethane, the second polyurethane used can be a polyurethane which differs from the first polyurethane of the thermoset layer in respect of properties and structure. However, it is also possible to use the same polyurethane as first polyurethane for the thermoset layer and as second polyurethane for the insulating layer. The rigid foam used for the insulating layer has low thermal conductivity and low density, so that the component can be used with good energy-efficiency in refrigeration equipment, or when high temperatures arise on the insulating-layer side there is no, or only a small, temperature increase on the other side.

The material for the rigid foam used for the insulating layer is preferably such that thermal conductivity is less than 25 mW/(m·K) and that density is less than 50 g/L.

The use of polyisocyanurate or polyurethane as material for the insulating layer gives good adhesion between insulating layer and thermoset layer, due to similar chemical structure.

One embodiment of the layer structure also comprises at least one layer of coating material in order to obtain further surface protection and/or in order to influence the optical properties of the surface, in particular in respect of scratch resistance and gloss. The layer of coating material is preferably composed of a polyurethane- or polyurea-based coating material. The coating material can also comprise dyes or pigments in order to influence optical properties. It is possible to use either water-based or else solvent-based or solvent-free (100% solid) coating materials.

Here again, use of polyurethane- or polyurea-based coating materials and the resultant chemical similarity to the thermoset layer achieves very good adhesion.

For good adhesion of the elastomer layer on the thermoset layer it is moreover preferable that the elastomer layer is composed of a material selected from the group consisting of homopolyurethane, homopolyurea, and copolymers comprising polyurethane and polyurea. In order to obtain the elastomeric properties of the elastomer layer, it is preferable to use a material with glass transition temperature below room temperature, with a very low level of crosslinking. The selection of the material for the elastomer layer is moreover preferably such that tensile strain at break is at least ten times greater than the tensile strain at break of the thermoset layer. It is moreover preferable that the elastomer layer has an elastic plateau over the usage temperature range. The usage temperature here is the temperature at which the component is used during operation. In one preferred embodiment, the elastomer layer comprises up to 100% by weight of polyurea. The advantages of polyurea are relatively generous processing latitude due to high intrinsic reactivity, improved heat resistance, better hydrolysis resistance, and good low-temperature flexibility, in comparison with polyurethanes of the same hardness, and also excellent abrasion properties. Copolymers of polyurethane and polyurea have the same advantages in comparison with pure polyurethanes, but to a lesser extent.

The properties of the elastomer layer, and also the properties of the thermoset layer, can be adjusted via addition of additives. Here again, examples of suitable additives are fibrous or pulverulent fillers, plasticizers, impact modifiers, flame retardants, dyes, and other additives which are known to the person skilled in the art and which are conventionally used in polymers.

The selection of the elastomer used for the elastomer layer is preferably such that it displays an elongation at break of at least 150%, more preferably of at least 250% and particularly preferably of at least 350%. The suitable maximum elongation at break preferably is 700% as it is difficult to use elastomers with higher elongations at break for producing layer structures. The elongation at break is determined according to DIN EN ISO 527:2012.

The preferred Shore hardness of the elastomer layer is lower than 95 Shore A, more preferably at most 85 Shore A and particularly preferably at most 80 Shore A, the Shore hardness being determined according to DIN ISO 7619-1: 2010.

Use of polyurethane, polyisocyanurate, or polyurea results in the use of chemically similar materials for all of the layers, and therefore easier recycling of the component.

It is moreover preferable that materials without fiber reinforcement are used for the individual layers. This can result in easier processing. In particular, there is no requirement to use molds specifically designed for the processing of fibers. Omission of fibers moreover reduces stress on the individual parts of the apparatus, and in particular there is less of the wear that occurs with fiber-reinforced polymers due to abrasion caused by the fibers used. Another advantage resulting from the lack of requirement to use fibers is the absence of fiber wastes that can lead to health hazard through formation of dust. Furthermore, when no orienting fillers such as fibers are used the component does not exhibit any anisotropic behavior.

The structure according to the invention makes it possible to avoid use of composite materials with similar properties. The component can thus achieve a weight saving. The use of similar materials for the individual layers can moreover provide shorter cycle times during the production process, costs of materials can be reduced, and it is possible to use combined metering equipment that is simpler and therefore less expensive. Another advantage is the possibility of a higher degree of automation, and of simpler design of the production apparatus.

In one embodiment, at least one of the layers comprises reinforcing fibers or fillers, in order to adjust the mechanical properties of the layer structure.

Examples of suitable fibers are glass fibers, carbon fibers, aramid fibers, potassium titanate fibers, mineral fibers and natural fibers. As already described above for the thermoset layer, the fibers here can take the form of continuous-filament fibers, long fibers, or short fibers, where the continuous-filament fibers used take the form of laid fiber screens, of knitted fabrics, of woven fabrics, or of nonwovens.

Particular reinforcing fillers are pulverulent fillers, for example chalk, kaolin, talc powder, or hollow glass spheres. In order to avoid anisotropic behavior it is preferable that fillers used are pulverulent fillers rather than fibers.

In one preferred embodiment, the arrangement has the individual layers of the layer structure in the following sequence: optionally layer of coating material, elastomer layer, thermoset layer, optionally insulating layer. It is also possible to apply a further layer of coating material to the thermoset layer, when no insulating layer is provided, or to the insulating layer. The arrangement here has the elastomer layer on that side of the component that is exposed to mechanical stress. It is thus possible to achieve good abrasion resistance, since the elastomer layer is more resistant to abrasion than a thermoset layer.

In one embodiment of the invention, the thermoset layer comprises a first sublayer and at least one second sublayer, where the first sublayer comprises the first polyurethane, where the first polyurethane has been foamed, and the at least one second sublayer comprises a third polyurethane, where the density of the third polyurethane is higher than the density of the first polyurethane. The second sublayer can, when necessary, provide higher component stiffness values. It is likewise possible to reduce or avoid deformation resulting from differences in materials shrinkage or from different coefficients of thermal expansion.

If there is only one second sublayer provided, the arrangement can have this on that side of the first sublayer that faces toward the elastomer layer or on that side of the first sublayer that faces away from the elastomer layer. In another embodiment it is also possible that the arrangement has a second sublayer on that side of the first sublayer that faces toward the elastomer layer and a second sublayer on that side of the first sublayer that faces away from the elastomer layer.

If a thermoset layer is used which comprises a first sublayer and at least one second sublayer, it is preferable that the thickness of the first sublayer is in the range from 1 to 30 mm and that the thickness of each second sublayer is in the range from 1 to 10 mm. It is particularly preferable that the thickness of the first sublayer is in the range from 2 to 25 mm, and in particular in the range from 3 to 20 mm. It is particularly preferable that the thickness of each second sublayer is in the range from 1 to 8 mm, and in particular in the range from 1.5 to 5 mm.

In one preferred embodiment, the thickness of the elastomer layer is in the range from 0.2 to 4 mm, and the thickness of the thermoset layer is in the range from 2 to 40 mm. It is particularly preferable that the thickness of the elastomer layer is in the range from 0.5 to 3.5 mm, and in particular in the range from 1.0 to 3 mm. It is particularly preferable that the thickness of the thermoset layer is in the range from 3 to 30 mm, and in particular in the range from 5 to 25 mm.

The thickness of the thermoset layer here is the overall thickness of the thermoset layer, i.e. in the case of a structure with a first sublayer and with at least one second sublayer it is the sum of the thicknesses of all of the sublayers.

The thickness of the elastomer layer and of the thermoset layer here also depends on the intended use of the component: by way of example, higher strength can be obtained via greater thickness.

A component composed at least to some extent of a layer structure is used by way of example in refrigeration equipment as replacement for metallic components or components made of composite materials, for example as replacement for housing parts.

Another usage sector is provided by vehicle parts, for example exterior parts which are subject to relatively stringent requirement for impact resistance and energy dissipation, for example for protection of pedestrians, or for use in construction machinery or agricultural machinery. Use of an insulating layer moreover permits use of the layer structure in the vicinity of an engine or in other hot regions of vehicles. The use of the layer structure of the invention can save weight, and it is moreover possible to produce complex and large components.

It is possible to produce not only exterior parts but also interior parts of vehicles, for example of cars and trucks, railroad cars, trams, ships, or aircraft, made from the layer structure of the invention. By using the layer structure it is possible to realize a surface that has abrasion resistance and low flammability.

The properties of the finished component can be adjusted via use of suitable additives, for example flame retardants, dyes, or other additives conventionally used in polymers, in all of the polymer layers of the component or in selected polymer layers of the component. The person skilled in the art is aware of appropriate additives.

In another embodiment, the component is a separator in the coal and steel industry, for example a spiral separator for the separation of ore particles in respect of the size and/or shape thereof. The elastomer layer achieves improved abrasion resistance. It is moreover possible to produce appropriate separators which provide shorter cycle times and a higher degree of automation in comparison with composite-load-bearing structures resulting from manual processes.

Another usage sector for the component is as housing for an electrical device, for example as transformer housing or as nacelle for a wind turbine.

Finally, it is also possible to use the components as sports equipment or sanitary articles, for example bathtubs, shower troughs, whirlpools, swimming pools, or washbasins.

Irrespective of the application, the use of the layer structure of the invention provides, in comparison with the use of conventional materials, greater freedom in respect of geometry, shape, and surface structure. It is moreover possible to integrate components directly during manufacture, so that fewer connections are required, and greater integrity can be achieved. It is moreover possible to configure the component in a manner specific to an application, for example via selected manufacture.

It is particularly preferable to produce the component via a process comprising the following steps:
(i) provision of a female mold into which the individual layers of the layer structure are introduced, or of a male mold to which the individual layers of the layer structure are applied, (ii) production of the elastomer layer via spraying,
(iii) production of the thermoset layer via spraying,
(iv) demolding of the resultant component,
where step (ii) can be carried out before step (iii) or step (iii) can be carried out before step (ii).

The spraying process for the production of the elastomer layer and of the thermoset layer can realize a wet-in-wet application process which gives particularly good adhesion between the layers. Another advantage of the production process via spraying is that it is possible to produce a uniform layer thickness. The spray-application process moreover does not displace the material of any layer underneath the layer currently requiring manufacture. Another advantage is that it is possible to use an open mold and that there is no requirement for a new mold for each layer. It is sufficient to provide a female mold into which the layers are introduced, or alternatively a male mold to which the layers are applied. Processing steps such as punching, bending, drilling, coating, abrasive processes, degreasing, soldering, welding, adhesive bonding, and other preparation steps (used for metal outer layers) can be omitted. It is also possible in individual cases, in accordance with application sector and loading, to apply the elastomer layer and/or thermoset layer with a greater thickness over the entire component or in certain regions. Here a greater thickness of the layer can be realized, for example, by a higher material throughput in the spraying process or by longer spraying times. The preferred method to achieve greater thickness of the layers is to spray various individual layers of the same material, the individual layers joining to form one continuous layer after spraying.

An alternative to producing the layer structure by spraying the individual layers is producing the layer structure by sequential casting processes or by a combination of spraying and casting processes. However, when compared to a production consisting entirely of spraying the individual layers, this bears the disadvantage that many molding steps with multiple molds or mold modifications are necessary.

If there is a layer of coating material provided in addition to the thermoset layer and elastomer layer, in one embodiment a layer of coating material is applied to the female mold or male mold. In this case it is moreover preferable that the material for the layer of coating material comprises a release agent, in order to permit easy demolding. If a layer of coating material is first applied to the female mold or male mold, this is preferably likewise applied via spraying.

In another embodiment, after the production of the elastomer layer and the thermoset layer, a layer of coating material is also applied to the component. The layer of coating material here can be applied to the component before the demolding process or after the demolding process.

If the layer of coating material is applied after the demolding process, it is possible to omit the application of the layer of coating material to the female mold or male mold, since in this case all areas of the component are freely accessible for the application of the layer of coating material. However, it is nevertheless possible to apply a layer of coating material to the female mold or male mold, and to apply a further layer of coating material after the demolding process—especially at the regions having no layer of coating material.

If an insulating layer made of rigid foam is also used, this can likewise be applied via spraying, or alternatively can be cast into a closed mold. The foaming process can use either chemical or physical blowing agents. Chemical blowing agents generally comprise two different components which begin to react chemically with one another on exposure to heat and thus form a gas. Formation of the gas foams the polymer. A physical blowing agent does not change its structure, and can be comprised either in the form of pressurized gas or in the form of a liquid within the polymer. If the physical blowing agent is comprised in the form of pressurized gas, this expands as soon as the polymer is softened, and the foam is thus formed. A blowing agent used in the form of liquid is vaporized on exposure to heat, and thus foams the polymer.

If an insulating layer is provided, this is introduced into the mold either before the introduction of the elastomer layer and the thermoset layer, or alternatively after the introduction of the elastomer layer and the thermoset layer. If more than one thermoset layer and more than one elastomer layer are provided, it is also possible to arrange the insulating layer between two composites made of elastomer layer and thermoset layer. However, preference is given to the elastomer layer as one of the exterior layers either between thermoset layer and layer of coating material or, if no layer of coating material is provided, as concluding layer on the thermoset layer. It is preferable that the insulating layer is applied to the thermoset layer.

For successful demolding of the component, it is possible to apply a release agent to the male mold or female mold before introduction of the individual layers.

In order to improve adhesion between the individual layers, reduce any stresses that may arise, and ensure complete hardening, it is moreover possible to heat the component before the demolding process or after the demolding process. Heating can generally provide a still further improvement in mechanical properties and thermal properties of the individual layers and of the entire structure.

Another possible alternative, alongside the production of an independent layer structure, is to apply the individual layers subsequently to an existing structure. In this case it is preferable to begin by applying the insulating layer, to the extent that such a layer is provided, and then to apply the thermoset layer, and thirdly to apply the elastomer layer, and finally to apply the layer of coating material, to the extent that such a layer is provided. It is possible here to apply a plurality of elastomer layers and thermoset layers in alternation.

The process of the invention moreover permits integration of structural elements into the individual layers of between two layers. Examples of appropriate components are feet, elements associated with screw threads, for example aimed at subsequent use of screw threads to apply handles, legs, etc., protective covering elements for generators or refrigerator equipment, decorative materials, and logos.

Finally, before or after the demolding process, it is possible to use mechanical or thermal methods for adjustment to a required shape, for example via cutting-to-size.

EXAMPLES

For the examples one layer structure respectively was produced by sequential spraying of a layer of coating material, an elastomer layer and a thermoset layer. In some examples no layer of coating material or elastomer layer was used, for comparison purposes. As the final step, the layer structure was placed in a mold and coated with a rigid foam in the closed mold. Square specimens with a side length of 4 cm were cut from the component produced this way.

In a ball drop test the impact resistance of the specimen was determined. The diameter of the spherically shaped tip of the drop weight was 20 mm. The specimens were exposed to 30 joule in the ball drop test. The impact on the specimen took place on the side away from the rigid foam.

For the layer structure in the individual examples the following material was used:

Layer of Coating Material:

A commercially available high-strength, solvent-free, two-component gel coating on a polyurethane/polyurea-copolymer basis with a hardness of more than 70 Shore D.

Elastomer A:

A spray polyurethane/polyurea-copolymer with 10% by weight of surface-coated calcium carbonate with a mean particle size d50 of 3 μm and d98 of 15 μm and with a hardness of 95 Shore A and 46 Shore D, determined according to DIN ISO 7619-1:2010, respectively, a density of 1100 kg/m$^3$ determined according to DIN EN ISO 1183-1:2013, a tensile strength of 14 MPa, an elongation at break according to DIN EN ISO 527:2012 of 100% and a tear resistance according to DIN ISO 34-1:2004 of 53 N/mm.

Elastomer B:

A spray polyurethane/polyurea-copolymer with 10% by weight of surface-coated calcium carbonate with a mean particle size d50 of 3 μm and d98 of 15 μm and with a hardness of 77 Shore A, determined according to DIN ISO 7619-1:2010, a density of 1060 kg/m$^3$ determined according to DIN EN ISO 1183-1:2013, a tensile strength von 8 MPa, an elongation at break according to DIN EN ISO 527:2012 of 460% and a tear resistance according to DIN ISO 34-1: 2004 of 20 N/mm.

Thermoset A:

A spray polyurethane/polyurea-copolymer with 20% by weight of chalk and with a hardness of 63 Shore D determined according to DIN ISO 7619-1:2010, a bulk density of 600 kg/m$^3$ determined according to DIN EN ISO 845:2009, a 3 point flexural modulus of elasticity of 870 MPa, a flexural strength of 21 MPa, a deflection of 7 mm, determined according to DIN EN ISO 178:2010 and DIN EN ISO 178 A1:2013, respectively, and a glass transition temperature of more than 70° C.

Thermoset B:

A spray polyurethane with 15% by weight of chopped glass fiber with a fiber length of 8 mm and with a bulk density of 850 kg/m$^3$ determined according to DIN EN ISO 845:2009, a tensile strength of 32 MPa, an elongation at break of 2% according to DIN EN ISO 527:2012 and a glass transition temperature of more than 70° C.

The rigid foam used was Elastocool® 2030/13/OT by BASF Polyurethanes GmbH.

Table 1 shows the results of the ball drop test for various layer structures.

TABLE 1

Results of the ball drop test

| No. | Layer | Layer thickness in mm | Result ball drop test |
|---|---|---|---|
| Example 1 | Elastomer A | 2.35 | Not passed |
| | Thermoset A | 4.60 | |
| | Rigid foam | 40.00 | |
| Example 2 | Layer of coating material | 0.15 | Not passed |
| | Elastomer A | 1.60 | |
| | Thermoset A | 7.20 | |
| | Rigid foam | 40.00 | |
| Example 3 | Thermoset A | 6.30 | Not passed |
| | Rigid foam | 40.00 | |

TABLE 1-continued

Results of the ball drop test

| No. | Layer | Layer thickness in mm | Result ball drop test |
|---|---|---|---|
| Example 4 | Layer of coating material | 0.20 | Not passed |
| | Elastomer A | 2.4 | |
| | Thermoset B | 4.60 | |
| | Rigid foam | 40.00 | |
| Example 5 | Thermoset B | 6.30 | Not passed |
| | Rigid foam | 40.00 | |
| Example 6 | Layer of coating material | 0.20 | Not passed |
| | Thermoset B | 6.30 | |
| | Rigid foam | 40.00 | |
| Example 7 | Elastomer B | 2.35 | Passed |
| | Thermoset A | 3.90 | |
| | Rigid foam | 43.40 | |
| Example 8 | Layer of coating material | 0.20 | Passed |
| | Elastomer B | 2.30 | |
| | Thermoset A | 4.00 | |
| | Rigid foam | 40.00 | |
| Example 9 | Layer of coating material | 0.20 | Passed |
| | Elastomer B | 2.3 | |
| | Thermoset B | 4.00 | |
| | Rigid foam | 40.00 | |
| Example 10 | Elastomer B | 2.3 | Passed |
| | Thermoset B | 4.00 | |
| | Rigid foam | 40.00 | |

The ball drop test was deemed to have been passed if after an impact of 30 joule no or only slight marks of the drop weight could be seen, if there were no tears in the elastomer and in the thermoset tears with a length of less than 2 cm occurred, the tears in the thermoset not affecting more than one layer.

The ball drop test was deemed to not have been passed if one of the following criteria was fulfilled:
- the layer structure comprising thermoset layer, elastomer layer if applicable, and layer of coating material displayed tears in all layers,
- in addition to the tears the rigid foam was deformed irreversibly,
- tears occurred in the layer of coating material and the mark of the drop weight can be discerned visually,
- a tear with a length of more than 2 cm occurred in the thermoset,
- the elastomer displays distinct tears with a length of more than 1 cm,
- the layer structure comprising thermoset layer, elastomer layer, if applicable, and layer of coating material, if applicable, does not show tears, but the rigid foam was so deformed irreversibly that this leads to an visible mark in the component or to an irreversible separation of the layers from the rigid foam below.

The examples clearly show that leaving off the layer of coating material does not seem to affect the results of the impact stress, but that an elastomer layer is indispensable. Furthermore, the physical properties of the elastomer layers have an effect of the results of the impact stress.

The invention claimed is:

1. A process for the production of a component comprising a layer structure, wherein the layer structure comprises the following layers:
   (a) an elastomer layer with density greater than 800 g/L, and
   (b) a thermoset layer comprising at least 50% by weight of a first polyurethane, wherein the elastomer layer has a Shore hardness according to DIN ISO 7619-1:2010 of less than 95 Shore A, wherein the process comprises the following steps:
(i) provision of one of a female mold into which the individual layers of the layer structure are introduced, or of a male mold to which the individual layers of the layer structure are applied,
(ii) production of the elastomer layer via spraying,
(iii) production of the thermoset layer via spraying, and
(iv) demolding of the resultant component,
wherein step (ii) can be carried out before step (iii) or step (iii) can be carried out before step (ii).

2. The process according to claim 1, wherein the thermoset layer is one of (a) foamed wherein the density thereof is less than 600 g/L, or (b) compact wherein the density thereof is greater than 800 g/L.

3. The process according to claim 2, wherein the thermoset layer comprises a first sublayer and at least one second sublayer, wherein the first sublayer comprises the first polyurethane, wherein the first polyurethane has been foamed, and wherein the at least one second sublayer comprises a third polyurethane, wherein the density of the third polyurethane is higher than the density of the first polyurethane.

4. The process according to claim 1, wherein the layer structure further comprises an insulating layer, wherein the insulating layer is composed of a rigid foam which comprises at least 80% by weight of at least one of a polyisocyanurate and a second polyurethane.

5. The process according to claim 1, wherein the elastomer layer has an elongation at break according to DIN EN ISO 527:2012 of at least 150%.

6. The process according to claim 4, wherein the layer structure further comprises at least one layer of coating material.

7. The process according to claim 1, wherein the elastomer layer is composed of a material selected from the group consisting of homopolyurethane, homopolyurea, and copolymers comprising polyurethane and polyurea.

8. The process according to claim 6, wherein the layer structure is in the following sequence: layer of coating material, elastomer layer, thermoset layer, insulating layer.

9. The process according to claim 3, wherein the layer structure has at least one of (a) a second sublayer on a side of the first sublayer that faces toward the elastomer layer, and (b) a second sublayer on a side of the first sublayer that faces away from the elastomer layer.

10. The process according to claim 9, wherein the thickness of the first sublayer is in the range from 1 to 30 mm, and the thickness of each second sublayer is in the range from 1 to 10 mm.

11. The process according to claim 1, wherein the elastomer layer comprises up to 100% by weight of polyurea.

12. The process according to claim 1, wherein the thickness of the elastomer layer is in the range from 0.2 to 4 mm and the thickness of the thermoset layer is in the range from 2 to 40 mm.

13. The process according to claim 1, wherein at least one of the layers comprises reinforcing fibers or fillers.

14. The process according to claim 1, where the component is selected from the group consisting of a separator for use in mining, a cooling device for an electrical device, a housing for an electrical device, part of a vehicle, part of sports equipment, and part of a sanitary device.

15. The process according to claim 1, wherein in a first step a layer of coating material is applied to the female mold or male mold.

16. The process according to claim 1, wherein a layer of coating material is applied to the component before the demolding process or after the demolding process.

17. The process according to claim 1, wherein the component is heated before or after the demolding process.

18. The process according to claim 1, wherein an insulating layer is also applied via spraying or casting.

* * * * *